Dec. 31, 1940.   D. O. HEADLEY   2,226,905
APPARATUS FOR MANUFACTURING BOTTLES
Filed Feb. 14, 1938    2 Sheets-Sheet 1

Inventor
Dore O. Headley
By
Eccleston + Eccleston
Attorneys

Dec. 31, 1940.   D. O. HEADLEY   2,226,905
APPARATUS FOR MANUFACTURING BOTTLES
Filed Feb. 14, 1938   2 Sheets-Sheet 2
Fig.4.
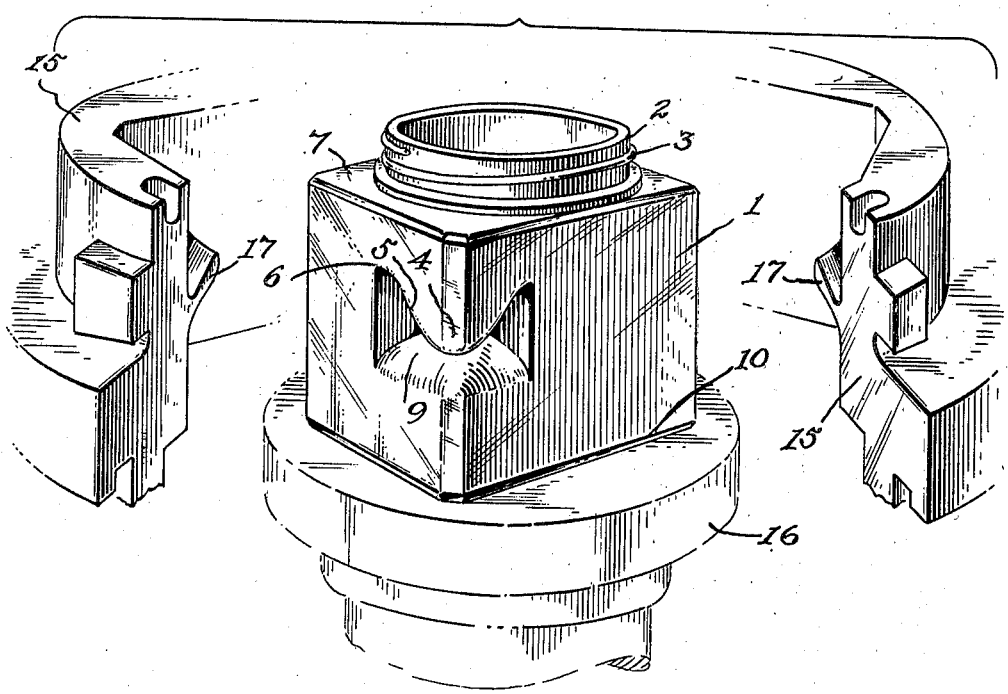
Fig.5.
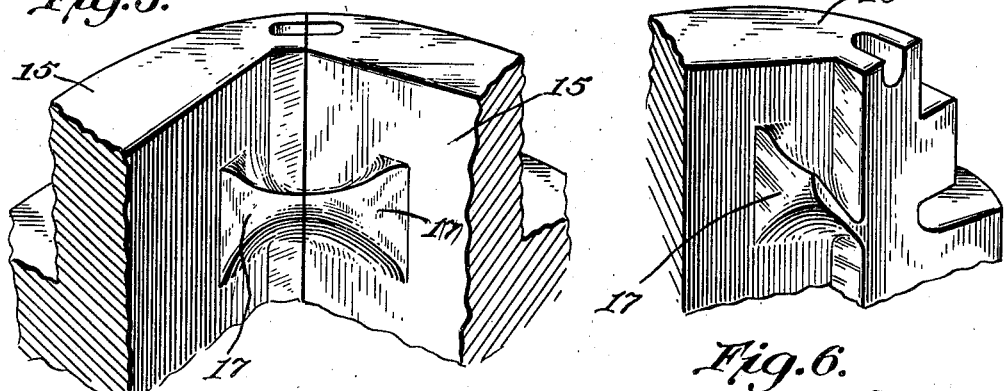
Fig.6.
Inventor
Dore O. Headley
By Eccleston & Eccleston
Attorneys Patented Dec. 31, 1940

2,226,905

UNITED STATES PATENT OFFICE 2,226,905

APPARATUS FOR MANUFACTURING BOTTLES

Dore O. Headley, Washington, Pa., assignor to Hazel-Atlas Glass Company, Wheeling, W. Va., a corporation of West Virginia Application February 14, 1938, Serial No. 190,512

5 Claims. (Cl. 49—69)

The invention relates to an apparatus for manufacturing glass bottles, particularly ink bottles, and one of the objects of the invention is to provide an apparatus by which it is possible to manufacture a bottle provided with a pocket, with substantially the same ease and speed as in the manufacture of conventional bottles without pockets.

Another object of the invention is to provide an apparatus for manufacturing bottles of this type, which necessitates no change in present forming machines, other than in the molds.

Various other objects and advantages of the invention will be apparent to those skilled in the art, from the following detailed description, when taken in connection with the accompanying drawings; in which, Figure 1 is a detail elevational view of the glass parison, neck ring, and lower portion of the plunger.

Figure 4 is a perspective view of a completed bottle, with the mold opened.

Figure 5 is a fragmentary perspective view showing the pocket forming elements, with the blow mold halves in closed position; and Figure 6 is a perspective view of one of the pocket forming elements, taken from a different angle.

Figure 1:
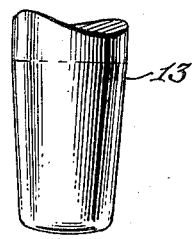

One form of ink bottle manufactured by the apparatus disclosed herein will be described before describing the apparatus.

Numeral 1 indicates the ink bottle, which in the specific embodiment illustrated, is oblong in cross-section. However, it is to be understood that the present invention is in no manner limited to the manufacture of a bottle of any particular cross-sectional shape, for it will be apparent that the invention is equally well adapted to the manufacture of round bottles, oval bottles, square bottles, triangular bottles, etc.

Numeral 2 refers to the conventional neck of the bottle, provided with screw threads 3, for a closure (not shown). Of course any type of closure may be employed with the bottle, and in place of threads any desired form of lugs may be employed.

The bottle disclosed herein is, in general outline, of conventional shape, and of course may be made in any of the conventional shapes, or otherwise. But in one portion of the bottle, intermediate its top and bottom, a portion of the wall turns inwardly and upwardly to form a pocket or well, and preferably the wall portion then turns outwardly into alignment with the original wall portions, and then turns downwardly to the bottom of the bottle.

The pocket is referred to by the numeral 4, and is conveniently located for the filling of fountain pens or the dipping of common pens, or for retaining either type of pen for ready use. It will also be noted that the pocket is located well below the top of the bottle, and is formed not by some partition in the bottle, but by the inturning and upturning of a portion of the wall itself.

The portion of the wall which is inturned and upturned is indicated by numeral 5. The upper end of this wall, in the specific form of bottle illustrated, terminates at the point 6, which is considerably below the top or shoulder 7 of the bottle.

From the point 6, the wall of the bottle illustrated, extends vertically downward a short distance, as indicated by numeral 8. At the lower end of the vertical portion 8 the wall turns outwardly, as indicated by numeral 9. And preferably this outwardly extending portion continues until it aligns, vertically, with the upper portions of the conventional walls, and it then turns downwardly, so that in general outline the bottle retains its conventional shape, and its complete conventional bottom 10. Thus there is no lessening of the stability of the bottle. In the specific form illustrated the outwardly extending portion 9 is convex or crowned.

It is well known in the art to provide a partition in a glass ink bottle, to form a well or pocket. But great difficulties are encountered in the manufacture of such bottles. Further, the partition extends above the shoulder of the bottle, in fact almost to the top of the neck, and to pour ink from the bottle into the pocket it is necessary to first secure the closure on the bottle. If this is not done, ink will be spilled out of the bottle; and if the closure is first secured in place, in accordance with its intended manner of use, then ink is smeared over the inside of the closure and the rim of the bottle.

In the bottle construction illustrated herein, there is no partition connected to the walls of the bottle, but on the contrary the wall itself turns inwardly and upwardly to form the pocket, thereby forming a container of this type of unusual strength and durability. And it will also be noted that the top of the inturned and upturned wall is spaced considerably below the top of the bottle, and the whole arrangement is particularly designed to permit ink to be poured from the bottle, into the well, even to the last drop, without necessitating the placing of the closure on the bottle. Thus the bottle construction avoids the trouble and loss of time required in putting the closure on and off every time ink is to be poured into the pocket, and also the closure and rim of the bottle do not become smeared with ink.

The present invention does not relate to the bottle, but to an apparatus for manufacturing bottles of the type shown and described herein, which apparatus will now be described.

The glass parison is formed in the usual way. As shown in Figure 1, the parison 11 has been formed, and the parison mold has been removed, leaving the parison suspended from the neck ring 12, in the well known manner. Numeral 13 refers to the pressing plunger, which has been elevated after pressing the parison.

After the glass parison has been formed and the parison mold opened, the blow mold halves 15 are closed about the parison, in cooperative relation with the mold bottom 16. The position of the parison 11 in the closed blow mold 15, is shown in Figure 2.

Each blow mold half is provided with a pocket forming element 17. As shown in the specific embodiment illustrated, each pocket forming element is located well below the top of the blow mold, and at the front edge of the blow mold halves, so that when the halves are brought together, for the blowing operation, the two pocket forming elements are brought together, as clearly shown in Figures 2 and 5.

Figure 2:
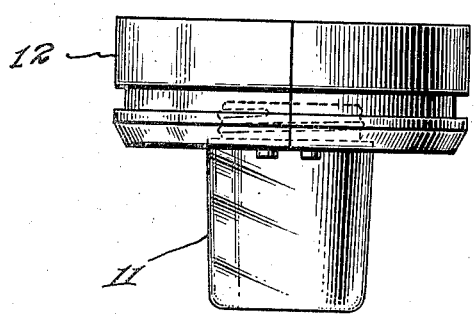
Figure 2 is a horizontal sectional view of the blow mold with the parison therein, prior to blowing.
Figure 2:
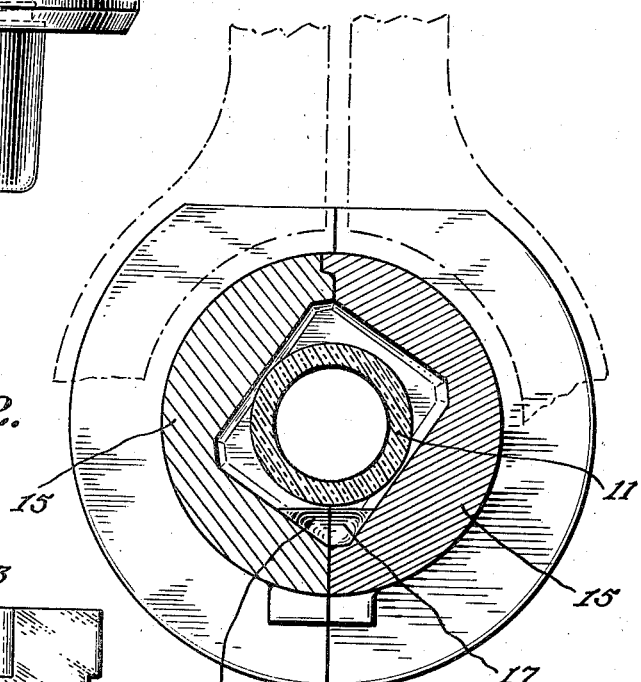

When the blow mold halves are moved to closed position, by the usual mechanism employed in conventional glass forming machines, the pocket forming elements 17 do not engage the glass parison, but position themselves adjacent to and clear of the exterior of the parison, as clearly appears in Figure 2.

Figure 3:
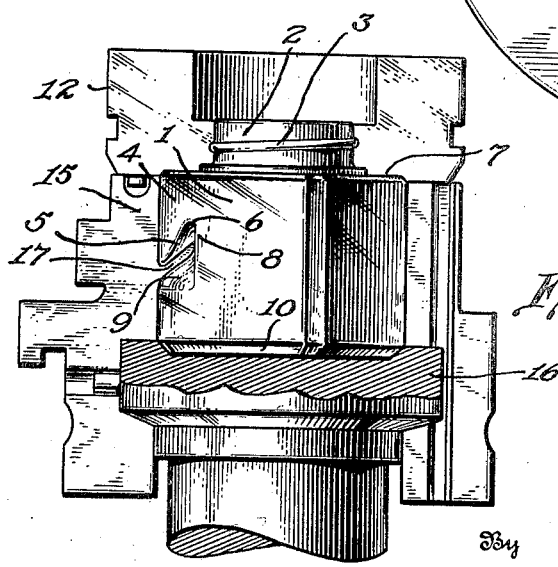
Figure 3 is an elevational view of a blow mold section, with a completed bottle in position therein.

In the ordinary operation of glass forming machines, blowing air is now admitted to the interior of the parison, to blow the parison to the shape of the interior of the blow mold. It will be apparent that when the blowing air is admitted, the glass of the parison adjacent to the pocket forming elements 17, will be blown over and downwardly along the upper surface of the pocket forming elements, to form the pocket 4, and also under and along the lower surface of the pocket forming elements, so that the parison assumes the shape shown in Figure 3, which shows one of the pocket forming elements still in place. Of course this blowing operation completes the bottle, and it is now only necessary to open the mold sections and remove the formed bottle, which step occurs in the conventional glass forming machines.

It is apparent that the particular shape of the pocket forming elements may be varied within wide limits, depending upon the particular shape of the pocket to be formed in the bottle, the particular shape of the bottle to be formed, etc. It is essential, however, that these elements be so shaped that when the blow mold is opened these elements will be freely withdrawn from the formed article, without breaking or deforming the article.

It will be apparent that the pocket forming elements disclosed herein can be so withdrawn. Each of these elements, in the specific embodiment disclosed, is inclined upwardly, with the upper surface curved downwardly from the blow mold wall, with the lower surface curved upwardly from the blow mold wall, and with the rear face ending in a vertical plane to form the vertical portion 8 of the bottle. But as mentioned above, the particular shape of the pocket forming elements can be varied within wide limits.

From the foregoing description it will be apparent that I have devised a novel apparatus for manufacturing glass ink bottles provided with pockets, and that by the apparatus herein disclosed such bottles can be manufactured by conventional glass forming machines, and with substantially the same ease and speed as in the manufacture of conventional ink bottles without pockets.

Having fully described the invention, what I claim is:

1. Apparatus for forming glass bottles, including a blow mold formed in two halves, pocket-forming elements mounted on the interior of said blow mold halves adjacent the meeting edges thereof, one of said elements on each mold half, each of said elements comprising a portion extending upwardly in spaced relation to the mold wall, said elements adapted to contact each other upon closing of the mold.

2. Apparatus for forming bottles, including a blow mold formed in two halves, pocket-forming elements mounted on the interior of said blow mold halves adjacent the meeting edges thereof, one of said elements on each mold half, each of said elements comprising a portion inclined inwardly and upwardly in spaced relation to the mold wall, said elements adapted to contact each other upon closing of the mold.

3. Apparatus for forming glass bottles, including a blow mold formed in two halves, pocket-forming elements mounted on the interior of said blow mold halves adjacent the meeting edges thereof, one of said elements on each mold half, each of said elements comprising a portion extending upwardly in spaced relation to the mold wall, the upper face of each element inclining downwardly from a portion of the mold wall, said elements adapted to contact each other upon closing of the mold.

4. Apparatus for forming glass bottles, including a blow mold formed in two halves, pocket-forming elements mounted on the interior of said blow mold halves adjacent the meeting edges thereof, one of said elements on each mold half, each of said elements comprising a portion extending upwardly in spaced relation to the mold wall, the lower face of each element inclining upwardly from a portion of the mold wall, said elements adapted to contact each other upon closing the mold.

5. Apparatus for forming glass bottles, including a blow mold formed in two halves, pocket-forming elements mounted on the interior of said mold halves adjacent the meeting edges thereof, one of said elements on each mold half, each of said elements comprising a portion extending upwardly in spaced relation to the mold wall, the upper face of each element inclining downwardly from a portion of the mold wall, the lower face of each element inclining upwardly from a portion of the mold wall, said elements adapted to contact each other upon closing the mold.

DORE O. HEADLEY.